UNITED STATES PATENT OFFICE.

JACOB ANTON WALDEMAR BREDENBERG AND ERNST GUSTAF CRON, OF STOCKHOLM, SWEDEN, ASSIGNORS TO AKTIEBOLAGET FUCUS, OF STOCKHOLM, SWEDEN, A COMPANY OF SWEDEN.

PROCESS OF EXTRACTING IODIN AND OTHER CHEMICAL PRODUCTS FROM SEAWEEDS BY DRY DISTILLATION.

1,305,058.   Specification of Letters Patent.   Patented May 27, 1919.

No Drawing.   Application filed November 14, 1917.   Serial No. 202,023.

*To all whom it may concern:*

Be it known that we, JACOB ANTON WALDEMAR BREDENBERG and ERNST GUSTAF CRON, subjects of the King of Sweden, and residents of Stockholm, in the Kingdom of Sweden, have invented a new and useful Improvement in Processes of Extracting Iodin and other Chemical Products from Seaweeds by Dry Distillation, of which the following is a specification.

It is generally known that in seaweed there are quite a number of salts of iodin, bromin and alkali metals. Heretofore these substances have been extracted by incinerating, charring, or fermenting the seaweed and soaking the residue with water. It has now been established by trials, however, that iodin and bromin exist in seaweed partly in a volatile organic form, and of course it has not been possible to take care of these compounds according to the said old methods, but the same have become dissipated during the process. The present invention relates to a process according to which also these volatile compounds of iodin and bromin are taken care of.

The process is broadly characterized by this that the seaweed is subjected to dry distillation in a closed retort or still. The gaseous products formed during the dry distillation are suitably passed through a cooler and condensing apparatus in order to condense the condensable substances, after which the remaining gases which contain the volatile compounds of iodin and bromin, are passed through a metal salt, for instance a copper salt, which is capable of absorbing said volatile compounds.

When carrying out this process the seaweed is introduced into a closer retort or still of for instance clay or cast iron, provided with coolers and condensing apparatus. The still is then heated to such temperature that the contents are dry distilled and charred. The gaseous products formed during the dry distillation are passed through the cooler and the condensing apparatus in which some tar products, formic acid, acetic acid, and substances resembling phenols are deposited. The gases not condensed are then passed through a suitable receptacle containing a metal salt capable of absorbing volatile compounds of iodin and bromin, for instance, a copper salt, which salt will thus absorb all volatile iodin and bromin compounds contained in the seaweed. The remaining gas may suitably be used as fuel for heating the still. The residue in the retort or still at the end of the dry distillation is soaked with water in a known manner, when the salts in the residue are extracted, which salts may afterward be separated in any known manner. The acids as well as the other substances and tar products are extracted in a known manner from the distillate. By this process all valuable products contained in the seaweed are extracted.

We claim:

1. The process of extracting iodin and other chemical products from seaweeds, which consists in subjecting the seaweed to dry distillation in a closed retort and passing the non-condensable gases given off through a metal salt capable of absorbing volatile compounds of iodin and bromin.

2. The process of extracting iodin and other chemical products from seaweeds, consisting in subjecting the seaweed to dry distillation in a closed retort, passing the gaseous products formed during the dry distillation through a cooler and condensing apparatus for condensing condensable substances, passing the remaining gases not condensed through a metal salt capable of absorbing volatile compounds of iodin and bromin, soaking the residue in the retort at the end of the dry distillation with water, and separating the dissolved salts from one another.

JACOB ANTON WALDEMAR BREDENBERG.
ERNST GUSTAF CRON.